United States Patent [19]

O'Hara

[11] Patent Number: 4,485,005
[45] Date of Patent: Nov. 27, 1984

[54] HYDROCRACKING WITH A ZEOLITE IN AN ALUMINA BINDER PEPTIZED IN THE PRESENCE OF A SURFACTANT

[75] Inventor: Mark J. O'Hara, Mt. Prospect, Ill.

[73] Assignee: UOP Inc., Des Plaines, Ill.

[21] Appl. No.: 589,278

[22] Filed: Mar. 14, 1984

Related U.S. Application Data

[62] Division of Ser. No. 482,698, Apr. 6, 1983, Pat. No. 4,459,367.

[51] Int. Cl.³ .............................................. C10G 13/02
[52] U.S. Cl. ....................................................... 208/111
[58] Field of Search ......................................... 208/111

[56] References Cited

U.S. PATENT DOCUMENTS

| | | | |
|---|---|---|---|
| 3,897,327 | 7/1975 | Ward | 502/66 |
| 3,917,543 | 11/1975 | Bolton et al. | 502/66 |
| 3,945,943 | 3/1976 | Ward | 502/64 |
| 4,032,433 | 6/1977 | Petri et al. | 208/112 |
| 4,419,271 | 12/1983 | Ward | 208/111 |

Primary Examiner—Carl F. Dees
Assistant Examiner—Lance Johnson
Attorney, Agent, or Firm—James R. Hoatson, Jr.; John G. Cutts, Jr.; William H. Page, II

[57] ABSTRACT

A process for the conversion of a hydrocarbon charge stock is disclosed which process comprises reacting the charge stock with hydrogen at hydrocracking conditions in contact with a catalytic composite having improved selectivity to middle distillate product during hydrocracking which comprises alumina, a crystalline aluminosilicate, a Group VIB metal component and a Group VIII metal component and which catalytic composite is prepared by the method comprising admixing the alumina and crystalline aluminosilicate with a peptizing agent and an aqueous solution of a modified linear aliphatic polyether surfactant to form a dough; extruding the dough into discrete particles; and calcining and drying the particles.

3 Claims, No Drawings

HYDROCRACKING WITH A ZEOLITE IN AN ALUMINA BINDER PEPTIZED IN THE PRESENCE OF A SURFACTANT

CROSS REFERENCE TO RELATED APPLICATION

This application is a division of my copending application Ser. No. 482,698 filed April 6, 1983, now U.S. Pat. No. 4,459,367 all the teachings of which copending application are incorporated herein by specific reference thereto.

BACKGROUND OF THE INVENTION

1. Field of the Invention

The field of art to which this invention pertains is the catalytic conversion of hydrocarbons, particularly hydrocracking.

2. Decription of the Prior Art

The hydrocracking of hydrocarbons by catalytic means is old and well-known in the prior art. Hydrocracking of hydrocarbon oil, which may be high boiling fractions, such as for example reduced crudes, gas oils, topped crudes, shale oil, coal extract and tar sand extract, generally is performed at relatively high temperatures and pressures of the order of 500° F. and 500 psig and upward. Catalysts for the hydrocracking of hydrocarbons are generally moderate to strong hydrogenation catalysts.

The prior art hydrocracking catalysts will typically comprise one or more components selected from silica, alumina, silicaalumina, crystalline aluminosilicate, or other refractory inorganic oxide and at least one metal component from Group VIB or Group VIII. Hydrocracking catalysts containing alumina and a crystalline aluminosilicate have been shown to be particularly effective in the hydrocarbon hydrocracking process. One or more hydrogenation components have been selected by the prior art to serve as the hydrogenation component in hydroconversion catalysts. The prior art has broadly taught that hydrogenation components may be selected from at least the following metals: iron, cobalt, nickel, ruthenium, rhodium, palladium, osmium, iridium, platinum, chromium, molybdenum, tungsten, vanadium, niobium and tantalum. The prior art has also taught that a preferred component of hydrocracking catalyst is a crystalline aluminosilicate (CAS) and may be selected from at least the following crystalline aluminosilicates: X zeolite, Y zeolite, mordenite, etc.

As an example of the extensive prior art, U.S. Pat. No. 3,945,943 (Ward) discloses a hydrocarbon conversion catalyst comprising a crystalline aluminosilicate, an amorphous refractory inorganic oxide, a Group VIB component and a Group VIII component. This patent lacks any disclosure relating to the incorporation of a surfactant in admixture with alumina and an aluminosilicate, and the subsequent calcination of the resulting admixture.

It is generally recognized that catalysis is a mechanism particularly noted for its unpredictable nature. Minor variations in a method of manufacture or composition often result in an unexpected improvement in the catalyst product with respect to a given hydrocarbon conversion reaction. The improvement may be the result of an undetermined alteration in the physical character and/or composition of the catalyst product difficult to define and apparent only as a result of the unexpected improvement in the catalyst activity, selectivity and/or stability.

The present invention relates to the utilization of a novel catalyst in a hydrocarbon conversion process.

SUMMARY OF THE INVENTION

Accordingly, the invention is, in one embodiment, a process for the conversion of a hydrocarbon charge stock which comprises reacting the charge stock with hydrogen at hydrocarbon conversion conditions in contact with a catalytic composite having improved selectivity to middle distillate product during hydrocracking which comprises alumina, a crystalline aluminosilicate, a Group VIB metal component and a Group VIII metal component and which catalytic composite is prepared by the method comprising: (a) admixing the alumina and crystalline aluminosilicate with a peptizing agent and an aqueous solution of a modified linear aliphatic polyether surfactant to form a dough; (b) extruding the dough into discrete particles; and (c) calcining and drying the particles.

Other embodiments of the present invention encompass further details such as specific component concentrations of the catalytic composite, methods of preparation, preferred feedstocks and hydrocarbon conversion conditions, all of which are hereinafter disclosed in the following discussion of each of these facets of the invention.

DETAILED DESCRIPTION OF THE INVENTION

The hydrocarbon charge stock subject to hydroconversion in accordance with the process of this invention is suitably a petroleum fraction boiling in the range from about 200° F. to about 1200° F. Pursuant to the present process, the hydrocarbon charge stock is reacted with hydrogen at hydroconversion conditions which may include a hydrogen pressure from about 500 psig to about 3000 psig and a temperature from about 500° F. to about 900° F.

Petroleum hydrocarbon fractions which can be utilized as charge stocks thus include the gas oils, fuel oils, kerosene, etc., recovered as distillate in the atmospheric distillation of crude oils, also the light and heavy vacuum gas oils resulting from the vacuum distillation of the reduced crude, the light and heavy cycle oils recovered from the catalytic cracking process, light and heavy coker gas oils resulting from low pressure coking, coal tar distillates and the like. Residual oils, often referred to as asphaltum oil, liquid asphalt, black oil, residuum, etc., obtained as liquid or semi-liquid residues after the atmospheric or vacuum distillation of crude oils, are operable in this process although it may be desirable to blend such oils with lower boiling petroleum hydrocarbon fractions for economical operation. The petroleum hydrocarbon charge stock may boil substantially continuously between about 200° F. to about 1200° F. or it may consist of any one, or a number of petroleum hydrocarbon fractions, such as are set out above, which distill over within the 200°–1200° F. range. Suitable hydrocarbon feedstocks also include hydrocarbons derived from tar sand, oil shale and coal.

Since the petroleum hydrocarbons and other hydrocarbons as well which are hydroprocessed according to the process of this invention boil over a considerably wide range, it may be readily perceived that suitable reaction temperatures will lie within a correspondingly wide range, the preferred temperature ranges depending in each instance upon the particular petroleum hydrocarbon fraction utilized as a charge stock. For example, reaction temperatures from about 500° F. to about 1000° F. are generally operable. However, where the particular petroleum hydrocarbon fraction utilized boils within the range from about 700° F. to about 900° F., it is preferred to operate at reaction temperatures in the more restricted range from about 500° F. to about 900° F. Hydrocarbon conversion processes which are contemplated for the present invention may include for example desulfurization, denitrification, hydrogenation, hydrocracking, etc.

Pursuant to the present invention and as hereinabove mentioned, hydrogen is reacted with the hydrocarbon charge stock preferably at a pressure of from about 500 psig to about 3000 psig. The hydrogen circulation rate is preferably from about 500 standard cubic feet to about 20,000 standard cubic feet per barrel of charge stock, although amounts of from about 200 standard cubic feet to as much as 30,000 standard cubic feet per barrel are operable. The liquid hourly space velocity of the petroleum hydrocarbon charge stock is preferably from about 0.2 to about 10 depending on the particular charge employed and the reaction temperatures necessitated thereby. A suitable correlation between space velocity and reaction temperature can be readily determined by one skilled in the art in any particular instance. When utilizing a charge stock boiling in the range of from about 700° F. to about 900° F., a liquid hourly space velocity of from about 1 to about 3 is preferred.

One of the components of the catalyst utilized in the present invention is alumina. The alumina may be any of the various hydrous aluminum oxides or alumina gels such as alpha-alumina monohydrate of the boehmite structure, alpha-alumina trihydrate of the gibbsite structure, beta-alumina trihydrate of the bayerite structure, and the like. A particularly preferred alumina is referred to as Ziegler alumina and has been characterized in U.S. Pat. Nos. 3,852,190 and 4,012,313 as a by-product from a Ziegler higher alcohol synthesis reaction as described in Ziegler's U.S. Pat. No. 2,892,858. For purposes of simplification, the name "Ziegler alumina" is used herein to identify this material. It is presently available from the Conoco Chemical Division of Continental Oil Company under the trademark Catapal. This material is an extremely high purity alpha-alumina monohydrate (boehmite) which after calcination at a high temperature has been shown to yield a high purity gamma-alumina.

Another component utilized in the preparation of the catalyst utilized in the present invention is a surfactant. The surfactant is preferably admixed with the hereinabove described alumina and the hereinafter described aluminosilicate. The resulting admixture of surfactant, alumina and aluminosilicate is then formed, dried and calcined as hereinafter described. The calcination effectively removes by combustion the organic components of the surfactant but only after the surfactant has dutifully performed its function in accordance with the present invention. Any suitable surfactant may be utilized in accordance with the present invention. A preferred surfactant is a surfactant selected from a series of commercial surfactants sold under the trademark "Antarox" by GAF. The "Antarox" surfactants are generally characterized as modified linear aliphatic polyethers and are low-foaming biodegradable detergents and wetting agents. These surfactants are more commonly used in household and industrial detergents.

Another component of the catalyst utilized in the present invention is a crystalline aluminosilicate (CAS) or zeolite. It is preferred that the zeolite is exchanged with rare earth metals according to any suitable method or manner known in the art or otherwise. The rare earth exchange may be performed either before or after the zeolite is composited with any of the other components of the catalyst of the present invention. For example, the rare earth salt solution may be prepared using commercially available rare earth salts which are generally a mixture of lanthanum, cerium and minor quantities of other rare earths. Preferably, rare earth chlorides are used, however, it is also contemplated that sulfates and nitrates may be used if desired. The rare earth exchange solution preferably contains from about 0.1 to about 1 mole of rare earth salt per liter of solution. The exchange is conducted preferably at a temperature from about 100° F. to about 210° F. over a period from about 0.1 to about 3 hours. Generally it is preferred that prior to the aforementioned exchange procedure performed on a faujasite zeolite, the alkali metal content of the faujasite is reduced from an initial level of about 12 to 15% to about 1 to 3% by an ammonium nitrate solution exchange or any other suitable method. The zeolite may be composited with the alumina in any convenient method known in the prior art or otherwise. The alumina and zeolite may be pelleted or otherwise treated to obtain catalyst particles of the size and shape desired for the reaction to be catalyzed. The zeolite and alumina can also be formed in any desired shape or type of catalyst known to those skilled in the art such as rods, pills, pellets, tablets, granules, extrudates and the like form.

A suitable alumina-zeolite support or carrier material is prepared by mixing equal volumes of finely divided alumina and zeolite powder together with nitric acid solution to form a paste which is extruded and dried. A further step of calcination may be employed to give added strength to the extrudate. Generally, calcination is conducted in a stream of dry air at a temperature from about 500° F. to about 1500° F. As disclosed hereinabove, the surfactant is preferably admixed into the alumina-zeolite carrier material by the inclusion of a surfactant during the admixture and formation of the alumina and zeolite. Any convenient method may be used to incorporate a surfactant with the alumina-zeolite carrier material. A preferred method for the preparation of an alumina-zeolite carrier material is to admix an aqueous solution of a surfactant with the blend of alumina and zeolite before the final formation of the carrier material. A more preferred technique is to admix an aqueous solution of a surfactant with a blend of finely divided alumina and zeolite powder, and a peptizing agent such as a dilute nitric acid solution to form a paste which is extruded, dried and calcined. Any suitable peptizing agent may be selected for example, mineral acids, organic acids, ammonia, etc. A preferred peptizing agent is a mineral acid and a preferred mineral acid is nitric acid. In accordance with the present invention, the surfactant must be present in at least effective amounts. It is preferred that the surfactant must be present in the paste or dough in an amount from about 0.01 to about 10 weight percent based on the weight of the alumina and crystalline aluminosilicate.

As mentioned hereinabove, crystalline aluminosilicates (CAS) or zeolites are essential components of the catalyst utilized in the present invention. Any suitable crystalline aluuminosilicates may be employed and such suitable candidates may include the natural zeolites faujasite, mordenite, erionite and chabazite and synthetic zeolites A, L, S, T, X and Y. In general, these zeolites are metal aluminosilicates having a crystalline structure such that a relatively large adsorption area is present inside each crystal. Zeolites consist basically of three-dimensional frameworks of $SiO_4$ and $AlO_4$ tetrahedra with the tetrahedra cross-linked by the sharing of oxygen atoms. The electrovalence of the tetrahedra containing aluminum is balanced by the inclusion of cations in the crystal, for example, metal ions, ammonium ions, amine complexes, or hydrogen ions. The spaces in the pores may be occupied by water or other adsorbate molecules. Normally, the crystalline zeolites occur, or are prepared, in the sodium or potassium form. The zeolites presently preferred for application within the concept of this invention are those having relatively large pore sizes, i.e., 5 Angstroms or greater, generally characterized as being sufficient to admit hydrocarbon molecules or portions thereof to and from the interior of the zeolite. Illustration of zeolites within this class are zeolites L, T, X, Y, mordenite and the like. The desirability of employing larger size zeolites derives from the improved product distributions which result from their use, particularly in hydrocracking applications. Understandably the larger pore openings facilitate the migration of larger hydrocarbon molecules into the zeolite.

Other essential ingredients are a Group VIB metal component and a Group VIII metal component. Thus, the catalytic composite utilized in the present invention may contain metallic components from the group of molybdenum, tungsten, chromium, iron, cobalt, nickel, platinum, palladium, iridium, osmium, rhodium, ruthenium and mixtures thereof. The concentration of the catalytically active metallic components is primarily dependent upon the particular metals as well as the physical and chemical characteristics of the charge stock. For example, the metallic components from Group VIB are preferably present in an amount within the range from about 0.01 percent to about 20 percent by weight, the Group VIII metals in an amount within the range from about 0.01 percent to about 10 percent by weight, all of which are calculated as if the metallic component existed within the finished catalytic composite as the elemental metal. Preferred Group VIB metal components include molybdenum, tungsten and compounds thereof. Preferred Group VIII metal components include cobalt, nickel and compounds thereof.

After the alumina, a surfactant and crystalline aluminosilicate are composited, the composite is preferably dried at a temperature from about 200° F. to about 600° F. for a period from about 1 to about 24 hours or more and finally calcined at a temperature from about 700° F. to about 1200° F. for a period from about 0.5 to about 10 hours. The calcination effectively removes by combustion the organic components of the surfactant. This calcined carrier material is preferably ion-exchanged with an aqueous solution of rare earth salts, dried and calcined, if the crystalline alumino-silicate has not been previously rare earth exchanged. The calcined carrier material containing alumina and the rare earth exchanged crystalline aluminosilicate may be combined with the catalytically active metallic components in any suitable manner such as ion-exchange and/or impregnation with a suitable solution of the metallic components. Accordingly, a preferred method of preparing a catalyst comprising a metallic component with the hereinabove described carrier or support involves the utilization of water soluble compounds of the metallic component to impregnate the calcined support material. In accordance with another preferred method, at least a portion of the Group VIB or Group VIII metal component may be admixed with the dough before forming the dough into discrete particles. The method or timing of the incorporation of the Group VIB or Group VIII metal components is not critical for the present invention.

Regardless of the details of how the metallic component of the catalyst is combined with the alumina and crystalline aluminosilicate support, the resulting combination generally will be dried at a temperature from about 200° F. to about 600° F. for a period from about 2 to 24 hours or more and finally calcined at a temperature from about 700° F. to about 1400° F. for a period of about 0.5 to about 10 hours, and preferably 1 to about 5 hours.

It is preferred that the resultant calcined catalytic composite be subjected to reduction conditions prior to its use in the conversion of hydrocarbons. Preferably, substantially pure and dry hydrogen is used as the reducing agent in this step. The reducing agent is contacted with the calcined catalyst at a temperature of about 500° F. to about 1200° F. and for a period of time of about 0.5 to about 10 hours or more. Catalyst reduction may be performed in the conversion reactor during the start-up procedure or with the reducing atmosphere of the actual process conditions.

Although it is not essential, the resulting reduced catalyst is preferably subjected to a presulfiding operation designed to incorporate in the catalytic composite from about 0.05 to about 10 weight percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of the sulfur component, generally including a temperature range from about 50° F. to about 1100° F. or more. Catalyst sulfiding may be performed in the conversion reactor during the start-up procedure by passing sulfur-containing feedstock over the catalyst at sulfiding temperature.

The conditions utilized in the numerous hydrocarbon conversion embodiments of the present invention are those customarily used in the art for the particular reaction, or combination of reactions, that is to be effected. The catalyst utilized in the present invention is suitable for hydrocarbon conversion processes which may include alkylaromatic isomerization, paraffin isomerization, olefin isomerization, alkylation, denitrification, desulfurization, hydrogenation and hydrocracking.

The following example is given to illustrate further the preparation of the catalytic composite utilized in the present invention and the use thereof in the conversion of hydrocarbons. The example is not to be construed as an undue limitation on the generally broad scope of the invention as set out in the appended claims and is therefore intended to be illustrative rather than restrictive.

EXAMPLE

A 50/50 mixture of finely divided Kaiser alumina and finely divided Y faujasite zeolite having a particle size less than about 60 mesh, standard screen scale, was blended with a dilute aqueous nitric acid solution and the resulting dough was extruded, dried and calcined to provide a supply of alumina-zeolite support material. This calcined carrier material was ion-exchanged with an aqueous solution of rare earth chloride, water washed, dried and calcined. A batch of the resulting alumina-zeolite support material was impregnated with an aqueous impregnating solution containing nickel nitrate and ammonium metatungstate. The concentration of the metal salts was selected to provide a finished catalyst containing 4.3 weight percent nickel and 14.8 weight percent tungsten. After impregnation, the catalyst was dried and calcined for two hours at 1100° F. This reference catalyst is generally representative of the prior art catalyst and was designated as Catalyst A.

A 50/50 mixture of finely divided Kaiser alumina and finely divided Y faujasite zeolite having a particle size less than about 60 mesh, standard screen scale, was blended with a dilute aqueous nitric acid solution and 1% Antarox BL-240 based on the dry weight of the alumina and zeolite. The resulting dough was extruded, dried and calcined to provide a supply of alumina-zeolite support material. This calcined carrier material was ion-exchanged with an aqueous solution of rare earth chloride, water washed, dried and calcined. A batch of the resulting alumina-zeolite support material was impregnated with an aqueous impregnating solution containing nickel nitrate and ammonium metatungstate. The concentration of the metal salts was selected to provide a finished catalyst containing 4 weight percent nickel and 14 weight percent tungsten. After impregnation, the catalyst was dried and calcined for two hours at 1100° F. This catalyst was prepared in accordance with the present invention and was designated as Catalyst B. Catalyst B was prepared in the same manner as Catalyst A except that a surfactant was added during the preparation of the alumina-zeolite support material which was used to prepare Catalyst B.

In order to demonstrate the extraordinary characteristics of the catalyst utilized in the present invention, Catalysts A and B were separately tested in a small scale pilot plant. The feedstock selected for these tests was a vacuum gas oil having the properties presented in Table I.

TABLE I

| VACUUM GAS OIL FEEDSTOCK PROPERTIES | |
|---|---|
| Gravity, °API at 60° F. | 19.8 |
| Distillation, % over °F. | |
| 5 | 690 |
| 10 | 730 |
| 30 | 798 |
| 50 | 851 |
| 70 | 907 |
| 90 | 988 |
| E.P. | 1068 |
| Sulfur, weight % | 2.6 |
| Nitrogen, weight % | 0.16 |
| Hydrogen, weight % | 11.7 |

Both of these tests were conducted at conditions which included a liquid hourly space velocity of 1.0, a pressure of 2000 psig and a recycle gas rate of 12,000 SCFB.

Catalyst A was installed in the pilot plant and the vacuum gas oil was charged to the catalyst at a temperature which converted 84 weight percent of the feedstock to products having boiling points less than 650° F., i.e., 650° F.-minus product. Of the 650° F.-minus product, 40% had a boiling range from 300° F. to 650° F. and was considered to be middle distillate product. This 40% conversion to middle distillate is then referred to as a selectivity of 0.40.

Catalyst B was installed in the pilot plant and the vacuum gas oil was charged to the catalyst at a temperature which converted 84 weight percent of the feedstock to products having boiling points less than 650° F., i.e., 650° F.-minus product. Of the 650° F.-minus product, 70% had a boiling range from 300° F. to 650° F. and was also considered to be middle distillate product. This 70% conversion to middle distillate is then referred to as a selectivity of 0.70.

In summary both Catalyst A and Catalyst B were easily able to convert the vacuum gas oil to products boiling at a temperature less than 650° F. with essentially the same catalyst temperature. The surprising and significant difference is the outstanding ability of Catalyst B to produce 75% more middle distillate product than the prior art catalyst. Petroleum refiners have recently found that the demand for middle distillate has grown significantly at the expense of demand for naphtha and normally gaseous hydrocarbons. Therefore, hydrocracking catalysts which demonstrate a high selectivity for the production of middle distillate are highly sought. These hereinabove described tests demonstrate that the catalyst utilized in the present invention, Catalyst B, achieves superior middle distillate selectivity. The experimental results are summarized in Table II.

TABLE II

| SUMMARY OF RESULTS | | |
|---|---|---|
| Catalyst | Conversion to 650° F.-minus | Selectivity to 300°-650° F. |
| Catalyst | 84 | 0.40 |
| Catalyst B | 84 | 0.70 |

This summary clearly demonstrates surprising and unexpected results caused by the incorporation of a surfactant during the preparation of a carrier material comprising alumina and a crystalline aluminosilicate. The actual effect which the surfactant contributes during the formation of the carrier material comprising alumina and a crystalline aluminosilicate is not known for certain. It is hypothesized that the surfactant permits, among others, the alteration of the surface tension of the aqueous constituents in the resulting dough before drying, a swelling or raising effect within the moist dough and the subsequent void production during the combustion of the surfactant during the calcination step. It is believed that the extraordinary middle distillate selectivity is achieved by a novel combination of alumina and an aluminosilicate and the resulting pore structure which heretofore has not been attained or achieved by the prior art catalysts.

The foregoing description and example clearly illustrate the improvements encompassed by the present invention and the benefits to be afforded with the use of the process of the present invention.

I claim as my invention:

1. A process for the hydrocracking of a hydrocarbon charge stock which comprises hydrocracking said charge stock with hydrogen at hydrocracking conditions in contact with a catalytic composite having improved selectivity to middle distillate product during hydrocracking which comprises alumina, a crystalline aluminosilicate, a Group VIB metal component and a Group VIII metal component and which catalytic composite is prepared by the method comprising:

(a) admixing said alumina and crystalline aluminosilicate with a peptizing agent and an aqueous solution of a modified linear aliphatic polyether surfactant to form a dough;

(b) extruding said dough into discrete particles;

(c) impregnating said particles with a Group VIB metal component and a Group VIII metal component; and (d) calcining and drying said particles.

2. The process of claim 1 wherein said hydrocarbon conversion conditions include a temperature from about 500° F. to about 900° F., a pressure from about 500 to about 3000 psig, a liquid hourly space velocity from about 0.2 to about 10 and a hydrogen circulation rate from about 500 to about 20,000 standard cubic feet per barrel of hydrocarbon charge.

3. The process of claim 1 wherein said catalytic composite comprises from about 0.01 to about 20 weight percent Group VIB metal component and from about 0.01 to about 10 weight percent Group VIII metal component.

* * * * *